United States Patent [19]

Hama et al.

[11] Patent Number: 4,747,626

[45] Date of Patent: * May 31, 1988

[54] TUBING JOINT

[75] Inventors: Tomio Hama; Kiyoyasu Yamazaki, both of Okaya, Japan

[73] Assignee: Kabushiki Kaisha Nihon Pisco, Nagano, Japan

[*] Notice: The portion of the term of this patent subsequent to Jun. 10, 2003 has been disclaimed.

[21] Appl. No.: 840,452

[22] Filed: Mar. 17, 1986

Related U.S. Application Data

[63] Continuation of Ser. No. 628,400, Jul. 6, 1984.

[30] Foreign Application Priority Data

| Aug. 23, 1983 | [JP] | Japan | 58-153701 |
| Aug. 23, 1983 | [JP] | Japan | 58-153702 |
| Aug. 30, 1984 | [JP] | Japan | 59-88174 |

[51] Int. Cl.$^4$ ............................................. F16L 37/00
[52] U.S. Cl. ..................................... 285/308; 285/340
[58] Field of Search ................ 285/308, 340, 104, 105

[56] References Cited

U.S. PATENT DOCUMENTS

| 1,822,056 | 9/1931 | Noble | 285/340 |
| 3,837,687 | 9/1974 | Leonard | 285/340 |
| 4,084,843 | 4/1978 | Gassert | 285/340 X |
| 4,123,090 | 10/1978 | Kotsakis et al. | 285/340 X |
| 4,288,113 | 9/1981 | Saulnier | 285/308 X |
| 4,440,424 | 4/1984 | Mode | 285/340 |
| 4,586,734 | 5/1986 | Grenier | 285/340 |
| 4,593,943 | 6/1986 | Hama et al. | 285/340 X |

FOREIGN PATENT DOCUMENTS

| 2641472 | 3/1978 | Fed. Rep. of Germany | 285/340 |
| 210372 | 1/1967 | Sweden | 285/340 |
| 2010106 | 4/1981 | United Kingdom | 285/340 |

Primary Examiner—Dave W. Arola
Attorney, Agent, or Firm—Birch, Stewart, Kolasch & Birch

[57] ABSTRACT

A tubing joint comprises a grip-ring whose grip-nails bite the outer wall of a tubing inserted into the joint proper to prevent the inserted tubing from moving in the tubing-detaching direction, and a release-ring which releases the bite of the grip-nails on the outer wall of the inserted tubing. The grip-ring is formed in a zigzag ring having a number of notches cut radially and alternately from the inner and outer circumferences of the ring. The outer extremity side of the grip-ring is bent by a constant width in the tubing-admitting direction and the bent ends, i.e., outer extremities, are inserted into a catching section to hold the grip-ring within the joint proper. The inner extremities of the grip-ring formed by the notches serve as grip-nails.

7 Claims, 4 Drawing Sheets

TUBING JOINT

CROSS-REFERENCE TO RELATED APPLICATIONS

The present application is a continuation of copending application Ser. No. 628,400, filed July 6, 1984.

DESCRIPTION OF THE PRIOR ART

Various structures have been devices for tubing joints which connect flexible tubings for transferring liquids with each other.

In conventional tubing joints, several, say four, lock nails are provided on the inner wall of joint at regular intervals along a circumference with such a slant positioning that each nail is directed forward from the tubing-admitting opening. When a tubing is inserted, the tips of each nail are pushed outward by the wall of the tubing, and when a tubing once inserted is caused to move in the tubing-withdrawing direction, frictional force, etc. will allow the lock nails to bite the outer wall of tubing to prevent the disengagement of the tubing. To effect the withdrawal of tubing, the tubing joint is provided with a releasing means such as a release-ring which is designed to push the tips of lock nails outward to free the tubing from the biting action of the lock nails.

The above-mentioned conventional structure of tubing joints requires the lock nail itself to be rigid to a considerable degree. To meet this requirement, thick materials have been used for the lock nail to provide the required rigidity and the form of the tip of lock nail has been subjected to modifications, for example, into the form of a sharp blade to promote its capability of biting the outer wall of tubing.

The above-described structure using lock nails of high rigidity but low elasticity has a disadvantage in that, when the blade of lock nail happens to begin sliding on the outer wall of the inserted tubing, the lock nail will be hard to adjust itself to the movement of tubing, resulting in a lowered degree of bite onto the tubing. This disadvantage is increased when the tubing is made of a relatively hard material. It is true that a lock nail, when made thin, is capable of adjusting itself to the movement of tubing, but such nails are low in rigidity.

The present inventor has devised a grip-ring (Japanese Patent Application No. 56-177664), as shown in FIG. 1, effective to eliminate the above disadvantage, for which a plate of an elastic material such as phosphor bronze is punched to give a ring and a number of notches 1 and 2 are cut radially out alternately from both inner and outer circumferences.

The above-described grip-ring 3, as shown in FIG. 2, is caught by a groove 6 on a guide-ring 5 in a joint proper 4 so that the inner extremities of grip-ring 3 having notches 2 formed may bite the outer wall of an inserted tubing 7. An elastic sleeve 8 is designed to come into contact with the inner extremities from inside the joint to supplement the elasticity of the inner extremities. A release-ring 9 is pushed in the longitudinal direction for withdrawal of tubing 7, thereby pushing out the inner extremities of grip-ring 3.

Grip-ring 3 is in a zigzag ring as shown in FIG. 1 and thus, when tubing 7 is inserted to push out the inner extremities, the strong spring property peculiar to the unique zigzag form will produce various forces such as a torsional reactional force near the inner extremities in the tubing-inserting direction. Thus, even with a thin grip-ring 3, a strong spring property may be displayed by support of the supplement of elasticity from elastic sleeve 8. It should be noted that the spring property thus displayed is a so-called viscous spring property in contrast to the one produced by conventional grip-rings; thus, the grip-ring may adjust itself readily to even a slight movement of the inserted tubing in the tubing-withdrawing direction, biting the outer wall of the tubing for effective tubing retention, and after the grip-ring once bites the outer wall of tubing, unnecessarily stronger bite power will no longer be produced, i.e., no increase in depth of the bite trace on the outer wall of tubing may occur with lapse of time.

The above-described grip-ring 3, though having many advantages, has been found to have the following inherent disadvantage which stems from its planar form: As tubing 7 is pushed in, the inner extremities of grip-ring 3 are caused to expand with the outer extremities as fulcrums and the planar form of grip-ring 3 will result in expanding the effect of this local deformation over the entire grip-ring 3. To explain in more detail, when an insertion of tubing has expanded the inner extremities, the tensile force, etc. acting on the zigzag connected sections will, on the one hand, cause the notches 2 of the inner extremities to expand and, on the other hand, cause the notches 1 of the outer extremeties to shrink. Thus, when the inner extremities have been pushed out, the outer diameter of the outer extremities decreases. For such a sequence, an insertion of tubing 7 will cause a positional deviation of the fulcrum of the outer extremities within groove 6, which reduces the angle between the inner extremities and the outer wall of tubing 7, with lowered bite of inner extremities onto the outer wall of tubing 7, or which often causes disengagement of the outer extremities from groove 6.

Another problem has been experienced in the application of release-ring 9 to detaching tubing 7, as follows: Suppose that grip-ring 3 has bitten the outer wall of tubing 7 at the above displaced position, under which condition grip-ring 3 is at a deeper position and with a more deformation and a greater tilt than is prescribed. Under such a condition, to use release-ring 9 to release the bit of grip-ring 3, release-ring 9 needs to be pushed in further beyond the prescribed position, which will result in disturbed detachment of tubing or which will lead to unsuccessful detachment if some limit is imposed on the working distance of release-ring 6. In addition, even if a releasing has been effected by forcing the already-deformed grip-ring to deform futher, grip-ring 3 has often been deformed too much beyond its elasticity limit for its re-use.

Still further problems have been experienced in cases wherein the elastic force of grip-ring 3 has allowed itself to return from the above-described displaced position within groove 6 to the normal position with its bite kept on the outer wall of tubing 7: In this case, return tubing 7 is pushed back in the tubing-detaching direction without being fixed at the prescribed position for insertion, resulting in leakage of liquid; when release-ring 9 is pushed in for detaching the tubing, tubing 7 bitten by grip-ring 3 will slightly be pushed in to the initial, prescribed position for insertion and then release-ring 9 will begin to push out the inner extremities of grip-ring 3, when the positional condition with respect to the tubing, grip-ring, and release-ring is the same as the previously-described troublesome condition.

SUMMARY OF THE INVENTION

An object of the present invention is to provide a tubing joint which employs a grip-ring of bent structure capable of displaying a strong spring property so as not only to be free of positional deviation of the grip-ring but also to surely bite the outer wall of an inserted tubing.

Another object of the present invention is to provide a tubing joint which employs a stopper serving to prevent the grip-ring from getting deformed in excess of its elasticity limit so as to have a long service lifetime.

A still further object of the present invention is to provide a tubing joint which allows the grip-ring to have its grip extremities locked at a position slightly over the maximal bite position for the outer wall of inserted tubing so as to be capable of more secured biting on the outer wall of inserted tubing.

SPECIFICATION OF THE INVENTION

The preferred embodiment of the present invention will be explained in detail with reference to the accompanying drawings.

Figure 1:
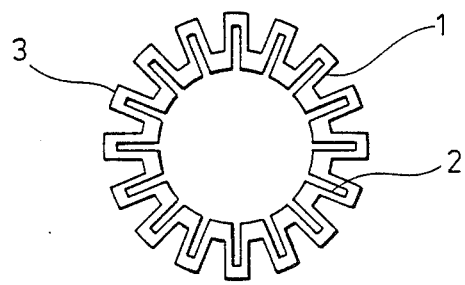
FIG. 1 is a front view of a conventional grip-ring.
Figure 2:
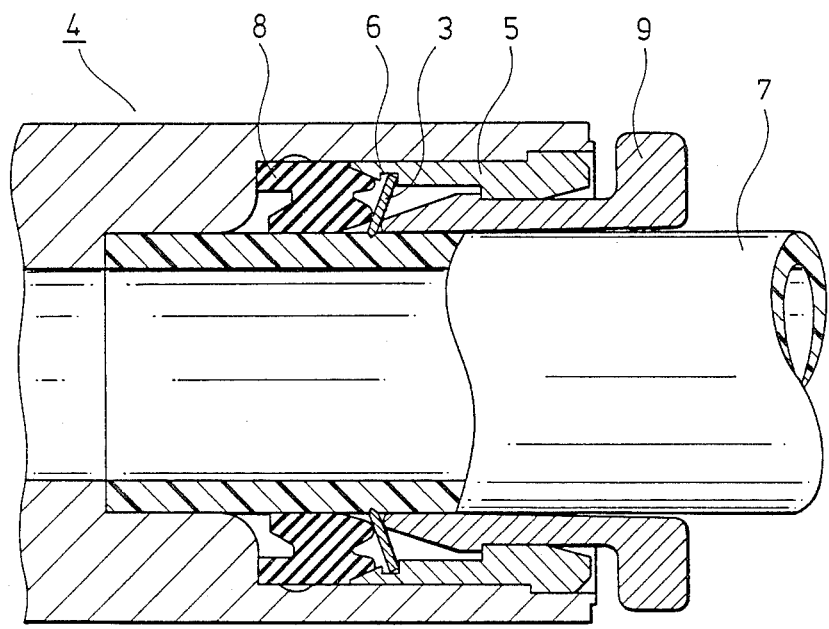
FIG. 2 is a sectional view illustrating the structure of a tubing joint with the grip-ring of FIG. 1 incorporated.
Figure 3:
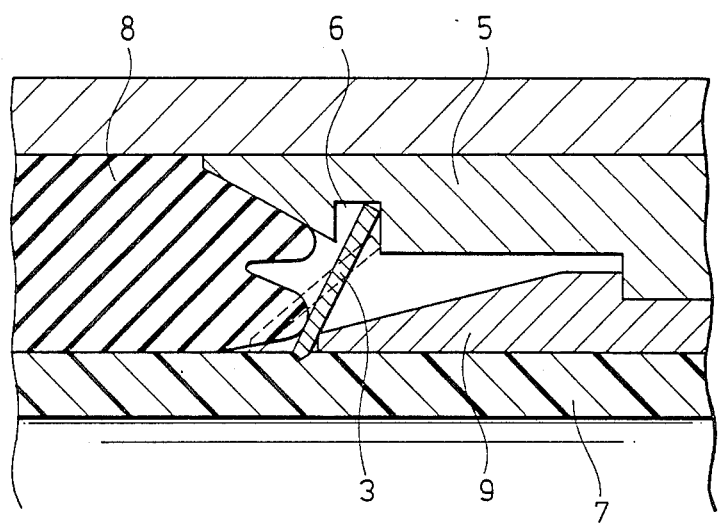
FIG. 3 is an illustrative view for the operation of the tubing joint of FIG. 2.
Figure 4:
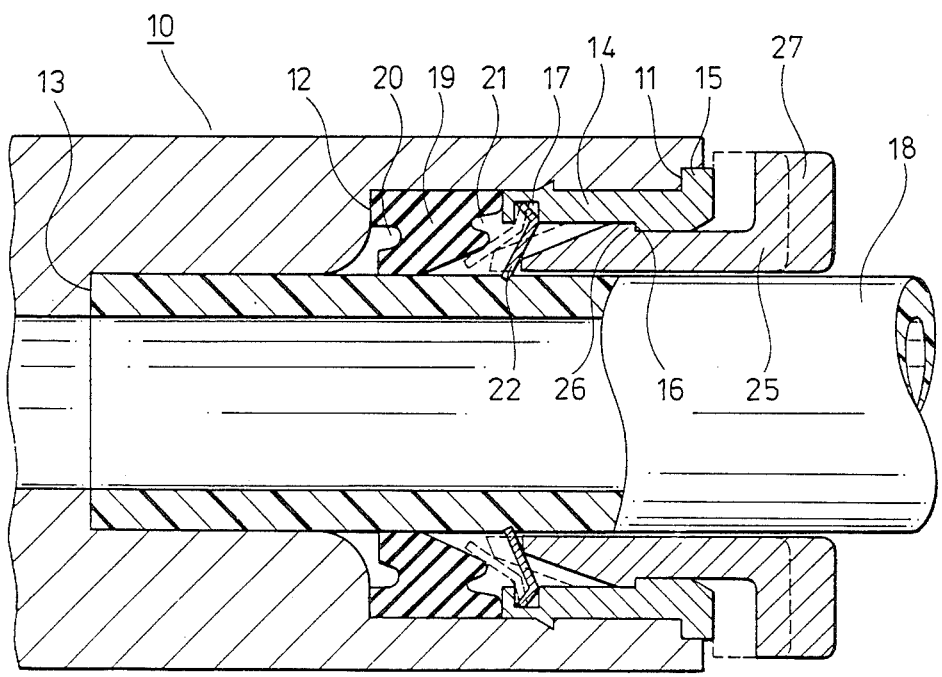
FIG. 4 is a sectional view of a tubing joint in accordance with the present invention.

Referring to FIG. 4, a joint proper 10 in an approximate cylinder is provided on its inner wall with the first step 11, the second step 12, and the third step 13 at successively farther positions from the tubing-admitting opening with successive reduction in inner diameter. A guide-ring 14 in an approximate cylinder is fixed inside joint proper 10 with its collar 15 in contact with the first step 11. Guide-ring 14 is provided, on its inner wall at its middle position, with a control step 16 and, at its innermost position, with a circular groove 17. The second step 12 makes joint proper 10 equal in inner diameter to a nylon or polyurethane tubing 18 to be inserted and, on the other hand, the third step 13 sets in position the tubing 18 to be inserted.

An elastic sleeve 19, in an approximate cylinder made of an elastic material such as rubber, is held between the second step 12 of joint proper 10 and guide-ring 14. Elastic sleeve 19 is porvided at each of its ends with each of circular relief grooves 20 and 21.

Figure 5A:
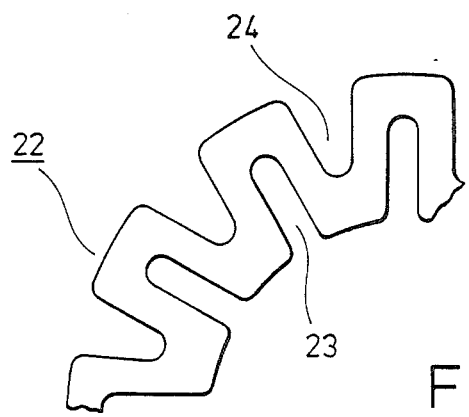
FIG. 5a is a front and FIG. 5b is a sectional view of a grip-ring.
Figure 5B:
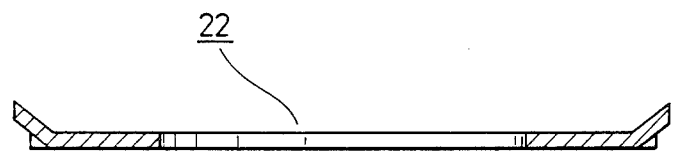

A grip-ring 22, as seen from FIG. 5, is prepared by punching a ring out of thin (ca. 0.2 mm) plate of an elastic material such as phosphor bronze and by making a number of radial notches 23 and 24 alternately from the inner and outer extremities of the ring into a zigzag ring.

Grip-ring 22 has its outer extremities caught by circular groove 17 and, on the other hand, uses its outer extremities to bite the outer wall of tubing 18, thereby preventing the tubing from being disengaged. Grip-ring 22 has its outer extremities bent by a prescribed width toward the tubing-admitting direction into a half-stretched L shape. The outer extremities, or bent ends, are positioned so as to be in touch with the corresponding circular corner of circular groove 17 or with the wall of circular groove 17 extending from that circular corner.

A release-ring 25 in an approximate cylinder (FIG. 4) is in sliding contact with guide-ring 14 and is movable in the longitudinal direction until its enlarged-diameter step 26 comes into touch with control step 16 of guide-ring 14 or until its collar 27 comes into touch with the tubing-admitting side of guide-ring 14. Release-ring 25 has its inner section beyond enlarged-diameter step 26 tapered with reduced diameter toward the innermost end and thus, release-ring 25, when pushed in, will push out, with its end, the inner extremities of grip-ring 22 toward elastic sleeve 19 and deform the inner extremity section of grip-ring 22 into a conical form, with resulting release of the bite of grip-ring 22 on the outer wall of tubing 18.

With the above-described structure, when the tubing 18 is inserted into joint proper 10 through release-ring 25, it goes under the elastic forces of the inner extremities of grip-ring 22 and of elastic sleeve 19, pushing outward the inner extremities of grip-ring 22, until it hits the third step 13. During this process, since grip-ring 22 has its outer extremities in contact with the corresponding corner section of circular groove 17 or with the wall of circular groove 17 on the side of that corresponding corner section, the pressure exerted on grip-ring 22 from the insertion of tubing 18 is received by the corner section or wall via the outer extremities corresponding to the bottom edge of a circular truncated cone formed by the bent section of grip-ring 22; this circular truncated cone is strong enough in shape to resist the pressure exerted. With conventional structures, when the inner extremities are pushed out with resulting expansion of the intervals between notches 23, the outer extremities are caused to shrink in diameter with resulting displacement within circular groove 17. The present invention is effective to eliminate such a disadvantage since, when the intervals between notches 23 are caused to expand, the intervals between notches 24 are also caused to expand contrary to conventional structures, because the outer extremities are designed to be in pressurized contact with the above-mentioned corner section or wall of circular groove 17. In addition, with the structure in accordance with the present invention, the overall balanced force produced by the high strength of the bent grip-ring sections, the above-mentioned action to expand both the notches 23 and 24, etc. is capable, as shown in FIG. 4, of expanding the inner extremities outward about the base of the bent sections as fulcrum, in contrast to the conventional grip-ring which is expanded as a whole about the outer extremities of grip-ring. Thus, the deformed section will have its diameter reduced so as to promote the biting of grip-nails on the outer wall of tubing 18, and, on the other hand, for the withdrawal of tubing 18, release-ring 25, upon being pushed in, will rapidly release the bit of grip-nails on the outer wall of tubing 18.

Figure 6:
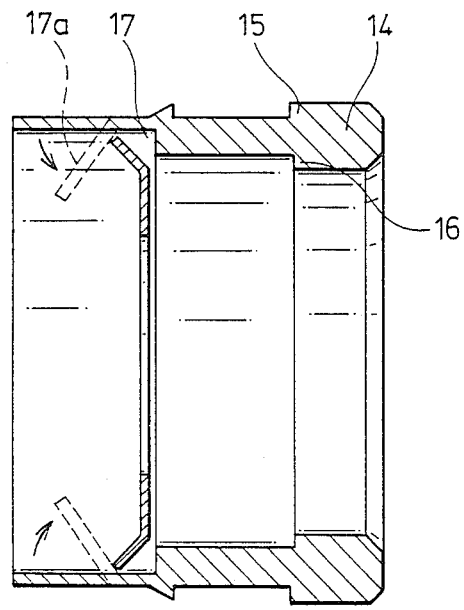
FIG. 6 illustrates how to put the grip-ring into a guide-ring to form the stopper wall for the inner extremities.

FIG. 6 illustrates how to incorporate grip-ring 22 in circular groove 17 on guide-ring 14.

The end section of guide-ring 14 is previously formed in a thin-walled cylinder. Grip-ring 22 is put into this cylinder with the prescribed positioning and then the end section of the cylinder is pressed into a wavy form to form circular groove 17, which keeps grip-ring 22 from disengagement.

The slant wall 17a at the pressed-in section of the cylinder serves to prevent the inner extremities of grip-ring 22 from being deformed beyond its elasticity limit.

Figure 7:
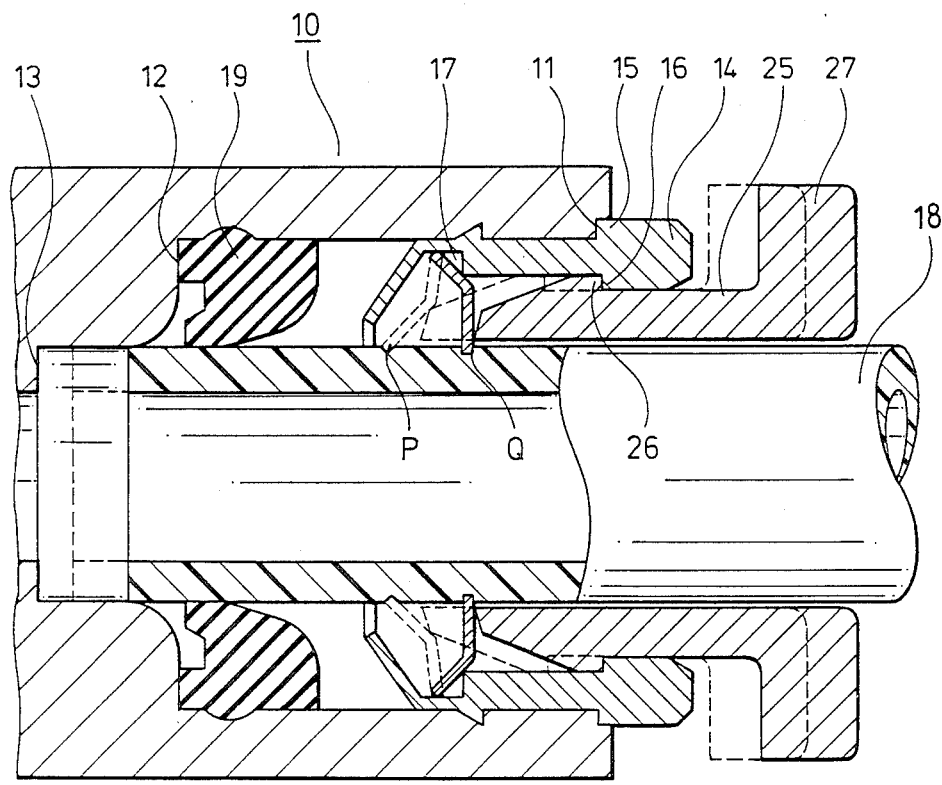
FIG. 7 is a sectional view of another tubing joint in accordance with the present invention.

FIG. 7 illustrates another embodiment of the present invention. A grip-ring 22 is put in a circular groove 17 with the direction of bending of the outer extremities coinciding with the admitting direction of tubing 18. Without tubing 18 inserted, grip-ring 22 is in the free state where the inner extremity section is in a plane perpendicular to the axis of the joint proper 10. A release-ring 25 has its outer diameter reduced forward from an enlarged-diameter step 26 and its length is so arranged that, when enlarged-diameter step 26 is in contact with a control step 16, the front end of release-ring 25 is positioned just in contact with the inner extremity face of grip-ring 22 or with a short gap to the inner extremity face.

With the above-described structure, when tubing 18 is inserted into joint proper 10 through release-ring 25, it goes under the elastic force of the inner extremities of grip-ring 22, pushing outward the inner extremities of grip-ring 22, until it hits the third step 13. During this process, tubing 18 being inserted will push grip-ring 22 but, since the outer extremities are bent in the direction for the insertion of tubing 18 or so as to press the inner wall of circular groove 17 under the pressing force frmo tubing 18, grip-ring 22 will not displace within circular groove 17 even under the pressing force from tubing 18, the inner extremities repeating to be expanded by a prescribed angle even by repeated insertion of tubing 18. Therefore, the inner extremities of grip-ring 22 will come into contact with the outer wall of tubing 18 with a prescribed tilt and bite the outer wall of tubing 18 by the action of their elastic force, usually preventing the disengagement of tubing 18. In this stage the inner extremities are positioned at P (FIG. 7). Now, tubing 18 is pulled back slightly in the detaching direction. The inner extremities biting the outer wall of tubing 18 will move together with tubing 18, making an arc movement about the outer extremities of grip-ring 22 as the fulcrum. They will pass the maximal bite position where the line connecting the outer and inner extremities is vertical to the outer wall of tubing 18 and finally reach position P (FIG. 4) where the inner extremities are positioned close to the front end of release-ring 25 positioned with its enlarged-diameter step 26 in contact with control step 16. Position Q is slightly beyond the maximal bite position described above and the quantity of bite of the inner extremities onto the outer wall of tubing 18 is greater at position Q than at position P, i.e., an adequate prevention of disengagement of tubing 18 is provided at position Q. If tubing 18 with position Q applied is to be drawn out, the inner extremities will go practically vertically toward the outer wall of tubing 18 without letting tubing 18 slide out and, at the same time, the inner extremity face will be controlled by the front end of release-ring 25 so as not to continue their arc rotation, i.e., the front end of release ring 25 serves as a stopper for the inner extremity face. The inner extremities will never go naturally to position P since the positional shift from Q to P requires the maximal bite position of the inner extremities with respect to tubing 18 to be exceeded. Thus, the inner extremities are positioned at the same stable position as without tubing inserted, biting the outer wall of tubing 18 in a locked sate with a preventive effect against disengagement of tubing 18.

As described above, the inner extremities of grip-ring 22 become locked when they have passed slightly beyond their maximal bite position on the outer wall of tubing 18 to contact the front end of release-ring 25. Therefore, even when tubing 18 has been deformed from a straight to arc form before use, the inner extremities will never get displaced on the outer wall of tubing, or no spiral dented traces will be formed so as to cause the disengagement of tubing.

For the withdrawal of tubing 18, pushing release-ring 25 as it is will not easily result in the required shift of the ring since grip-ring 22 is locked. As a preparative step, tubing 18 is first pushed in, which will easily return the inner extremities of grip-ring 22 from position Q to P. The step is followed by pushing release-ring 25 in the usual way, which will release the bite of the inner extremities with resulting detachment of tubing 18.

We claim:

1. In a releasable tubing connector comprising:
   a joint having at least an opening which is bored on an end face thereof:
   a guide-ring having an inner wall and fixed in said opening of said joint;
   a deformable ring plate, which is shaped zigzag by a plurality of notches formed alternately in inner and outer peripheral portions, disposed within a groove located on said guide-ring, said inner peripheral portion of said deformable ring plate having a smaller diameter than an outer diameter of a tube inserted into said opening of said joint, and the portions of said ring plate between said notches providing claws to bite into an outer wall of the tube to prevent the inserted tube from moving;
   a release-ring disposed within said guide-ring and movable by a prescribed distance at least in the longitudinal direction so as to release the bite of said claws by pushing said claws and displacing them from the outer wall of said inserted tube;
   stop means provided between an inner wall of said guide-ring and an outer wall of said release-ring for limiting the outward movement of said release-ring from said guide-ring;
   wherein said inserted tube, with said claws biting said outer surface thereof, can be pulled slightly backward in a tube-detaching direction, thereby causing said claws to make an arcuate rotation about the outer periphery of said deformable ring plate acting as a rotational fulcrum until said claws are brought to a position slightly over a position of maximum bite at which said claws are approximately normal to the surface of the inserted tube; and
   the front end of said release-ring, when in its outward position, provides a stopper to prevent further deformation of said claws of said deformable ring plate and maintain said claws at a position of slightly over maximum bite upon pulling on the inserted tube in a tube detaching direction.

2. A releasable tubing connector according to claim 1, wherein said groove is formed in said inner wall of said guide ring.

3. A releasable tubing connector according to claim 1, wherein said guide-ring is provided with a thin cylindrical section and said groove is formed by bending the thin-cylindrical section of the front end of said guide ring inwardly.

4. A releasable tubing connector according to claim 1, wherein said outer peripheral portion of said deformable ring plate is bent out of the plane of said ring plate by a constant width in the tube admitting direction, and is inserted in said groove.

5. In a releasable tubing connector comprising:

a joint having at least an opening which is bored on an end face thereof;

an outer sleeve fixed in said opening of said joint and having a groove in its inner periphery;

an inner sleeve, having a first and a second end, slidably received within said outer sleeve;

stop means between said inner and outer sleeves for preventing the total withdrawal of said inner sleeve from said outer sleeve;

a deformable ring plate which is shaped zigzag by a plurality of notches formed alternately in inner and outer peripheral portions, disposed within a groove in said outer sleeve, said inner peripheral portion of the deformable ring plate having a smaller diameter than an outer diameter of a tube inserted into the opening of said joint, and the portions of said ring plate between said notches providing claws to bite into the tube to prevent the inserted tube from moving;

said outer peripheral portion of said deformable ring plate being bent out on a plane of the inner peripheral portion in the direction of admission of the tube;

wherein, by pushing said inner sleeve in the direction of the tube insertion, said first end of said inner sleeve pushes said claws to release said claws from the tube; and wherein the inserted tube, with said claws biting the outer surface thereof, can be pulled slightly backward in a tube-detaching direction, thereby causing said claws to make an arcuate rotation about the outer periphery of said deformable ring plate acting as a rotational fulcrum until said claws are brought to a position slightly over a position of maximum bite at which said claws are approximately normal to the surface of the inserted tube; and the front end of said release-ring, when in its outward position, provides a stopper to prevent further deformation of said claws of said deformable ring plate and maintain said claws at a position of slightly over maximum bite upon pulling on the inserted tube in a tube detaching direction.

6. A releasable tubing connector according to claim 5, wherein said stop means are a control step provided on an inner face of the outer sleeve, and an enlarged diameter step provided on an outer face of the inner sleeve.

7. A releasable tubing connector according to claim 5, wherein the deformable ring plate is made of a thin plate whose thickness is approximately 2mm.

* * * * *